United States Patent Office 3,466,966
Patented Sept. 16, 1969

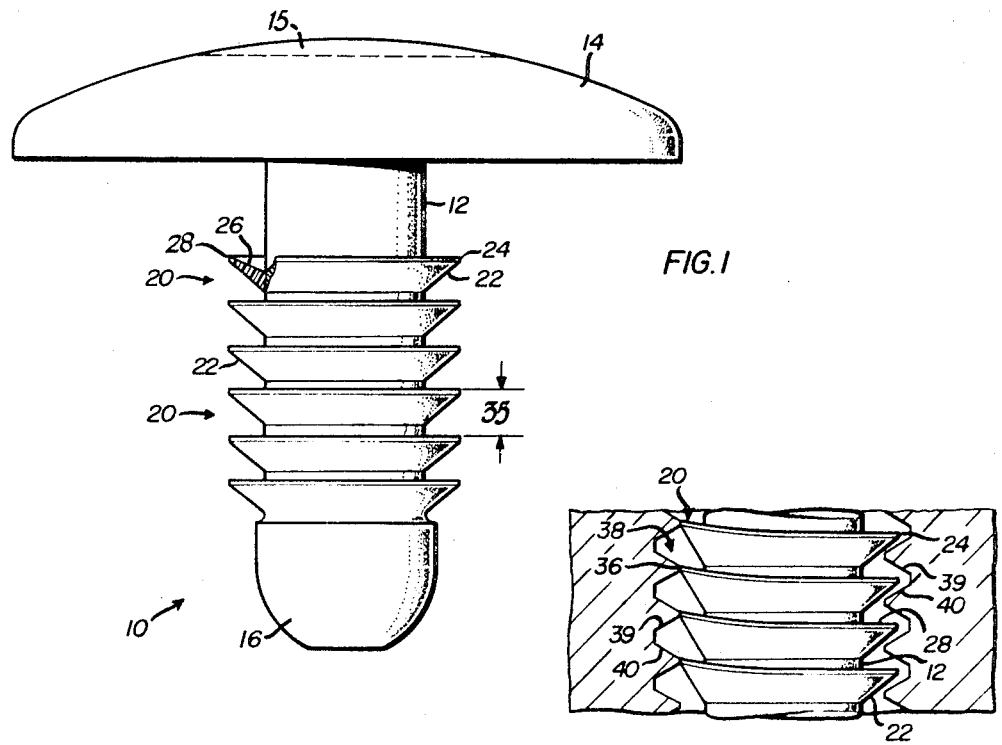
FIG. 1
FIG. 3
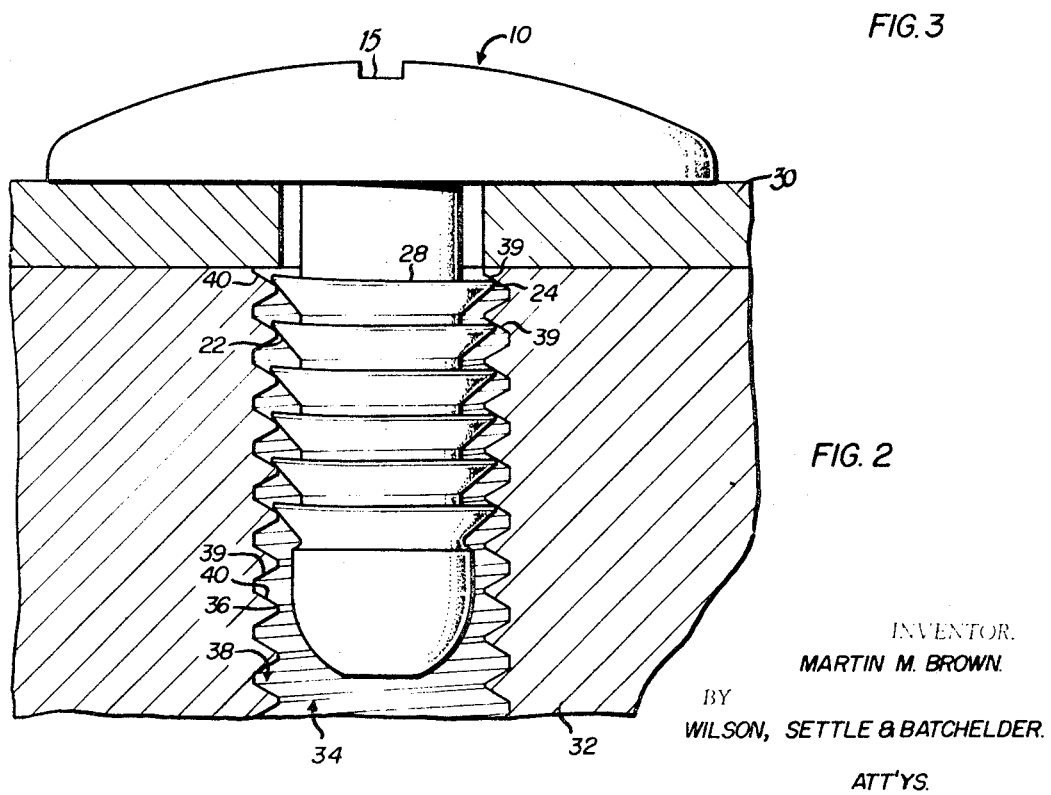
FIG. 2
INVENTOR.
MARTIN M. BROWN.
BY
WILSON, SETTLE & BATCHELDER.
ATT'YS.

3,466,966
RESILIENT FASTENING DEVICE IN THREADED BORE
Martin M. Brown, Birmingham, Mich., assignor to Robin Products Company, Warren, Mich., a corporation of Michigan
Filed Nov. 13, 1967, Ser. No. 682,329
Int. Cl. F16b 19/00, 13/04, 33/04
U.S. Cl. 85—5                                         3 Claims

ABSTRACT OF THE DISCLOSURE

A resilient fastening member having a plurality of spaced, dished members angularly disposed relative to the shank of the fastener. The spacing between adjacent ribs is proportioned relative to the pitch of a threaded aperture into which it is to be installed so that the fastener may be placed in the threaded aperture by axial movement and be removed therefrom by rotational movement.

BACKGROUND OF THE INVENTION

The present invention relates generally to fastening devices and more particularly to an improved rib fastener capable of being utilized in a threaded aperture.

One type of prior art fastener which has been utilized extensively for interconnecting two members or for connecting a member to a support is commonly referred to as the "plastic nail." This type of fastener includes a shank portion having a plurality of ribs formed integral therewith at spaced axial points on the shank. Conventionally, these ribs are dished shaped members which extend outwardly therefrom at an angle to the axis of the shank.

Heretofore, it has been conventional to insert the plastic fastener into an opening which was slightly larger than the diameter of the shank but smaller than the diameter of the ribs. Thus, the ribs would be deflected inwardly and the tendency of the material of the ribs to resume the normal position creates a frictional force between the contact area on the ends of the respective ribs and the inner wall defining the opening in the support. This frictional contact or engagement is sufficient to maintain the nail within the opening.

While this type of plastic nail has found remarkable success, there are some applications in which the fastener necessarily must be inserted in a threaded opening. Furthermore, many times it is necessary to remove the fastener from the threaded opening at some future time for replacement of parts, etc. In removing the plastic nail or fastener from a threaded opening, difficulties have been encountered in readily withdrawing the nail from the threaded aperture. Furthermore, in many instances, dependent upon thread size and the diameter of the opening, it has been found that the conventional type plastic ribbed fastener did not have sufficient holding power within the threaded opening. Stated another way, in some installations it was found that the contact area between the outer edges of the respective ribs and the internal or minor diameter of the threads allowed only limited contact to thereby cause the nail to be withdrawn from the opening with a minimum amount of force.

SUMMARY OF THE INVENTION

The deformable fastener of the invention includes a shank having an enlarged head at one end thereof with a plurality of angularly disposed ribs or louvers integral with the shank and of a diameter greater than the diameter of the shank. The axial spacing between the ribs is approximately equal to the pitch of the thread of a conventional internally threaded opening so that only a single rib is located in any portion of the helical groove defined by the thread. Also, a portion of each of the ribs is forced inwardly so that the tendency of the deflected member to resume its normal position will supply a sufficient force to allow the fastener to be removed from the threaded opening by rotational movement of the fastener.

Thus, the primary object of the present invention is to provide a fastener which can readily be inserted in a threaded opening by axial movement and which is capable of being removed from the threaded opening by rotational movement of the fastener.

Another object is to provide a plastic nail having a plurality of axially spaced ribs or louvers extending from a shank of the fastener with the spacing of the ribs being proportioned to the pitch diameter of a threaded opening into which the fastener is to be received.

Other objects of this invention will appear in the following description and appended claims, reference being had to the accompanying drawings forming a part of this specification wherein like reference characters designate corresponding parts in the several views.

On the drawings:

FIGURE 1 is a side elevational view of the fastener of the present invention;

FIGURE 2 is a vertical sectional view of the fastener installed in a threaded opening in a support;

FIGURE 3 is a fragmentary sectional view similar to FIGURE 2 taken along an axis perpendicular to the view shown in FIGURE 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

FIGURE 1 of the drawings shows a fastener 10 having a shank portion 12 with an enlarged head 14 at one end thereof which is slotted at 15 for reception of a screw driver, for a purpose to be described later. The shank portion of the fastener, which is preferably formed of a plastic material, has a radiused lower end portion 16 for aiding in aligning the fastener with an opening into which it is to be installed.

The fastener further includes a plurality of ribs or dished members 20 formed integral with and spaced axially on the outer surface of the shank. Each of the ribs of louvers has an inclined outer wall 22 which is angularly disposed relative to the axis of the shank and terminates at the outer end in a vertical wall portion 24. An inner wall 26, which is disposed at a slightly smaller angle to the axis of the shank than the outer wall 22, merges with the vertical wall to define an upper edge 28.

As shown in FIGURES 2 and 3, the plastic fastener 10 is utilized for securing a first member 30 to a second member or support 32. For purposes of illustration, the member 30 may be the strap forming the shoulder halter or harness in present day automobile seat belts while the support 32 may be the automobile body.

The support 32 has an internally threaded opening 34 formed therein. This opening may extend through the entire support or may terminate short of the remote surface of the support.

According to the invention, the fastener 20 is dimensioned and configured so as to be capable of being inserted into the threaded opening by merely applying axial force on the headed end of the fastener and is specifically designed to be capable of being removed therefrom by rotational movement or turning of the fastener. For this purpose, the axial spacing 35 between respective ribs or dished members approximates the pitch of the thread formed in the opening 34. Of course, in any conventional thread, there is formed a continuous rib 36 defining the minor diameter of the internal thread and which also defines a continuous groove 38 between the inclined walls 39, 40 of the rib 36.

By way of example and not of limitation, a ⅜″ diameter threaded opening conforming to the course-threaded series has 16 threads per inch. Thus, the pitch of the screw thread is ¹⁄₁₆ inch while the included angle between the walls defining the helical rib is 60°. According to the invention, a plastic fastener specifically designed for this threaded opening will include 16 ribs per inch of shank length with the ribs preferably being disposed at an angle slightly greater than the angle of the wall defining the groove 36.

Thus, in the illustrated embodiment, the included angle between the axis of the shank and the outer wall 22 of the ribs or dished members is 51°. This will limit the contact between the outer surface or wall of the inclined ribs and the inclined wall defining the groove to a point contact thus reducing the amount of friction which will be produced when the fastener 10 is forced into the opening by axial movement. Of course, the outside diameter or the major distance between the outer wall 24 of each rib is slightly greater than the minor diameter of the threaded opening.

The installed condition of the rib fastener in the opening can be appreciated from an inspection of FIGURES 2 and 3 of the drawing. Thus, considering the right hand portion of FIGURE 2, the upper edge 28 between the vertical wall 24 and the inner inclined wall 26 of each rib will be in contact with the upwardly inclined wall 39 of the helical groove at a common point disposed vertically and parallel to the axis of the opening. However, due to the helical nature of the rib 36 defined by the thread in the opening 34, the portion of the rib diametrically opposed to that portion referred to above will have its outer, inclined wall 22 in engagement with the edge defined by the upwardly inclined wall 40 of the groove 36 and the vertical wall defining the rib 36. As can readily be appreciated, the portions of each rib shown in the left-hand portion of FIGURE 2 will produce an axial force directed towards the head of the fastener 10 to tend to withdraw the fastener from the threaded opening. However, this force will be opposed by a second force defined adjacent the right-hand side of FIGURE 2 from each rib which is slightly deflected downwardly.

Considering now the depicted portion of the fastener and threaded opening shown in FIGURE 3, it will be appreciated that the vertical wall 24 defined on each rib 20 will have a portion thereof in alignment with the vertical wall defining the rib 36. Furthermore, the diametrically opposed section of the rib will be disposed between the respective walls 39 and 40 of the groove 38 defined in the thread and be spaced from each of these walls.

Briefly summarizing, it will be appreciated that approximately half of each rib will be deflected inwardly in varying degrees thus tending to produce an outwardly directed force tending to withdraw the fastener from the threaded opening. However, a major portion of the remaining portion of each rib will be in engagement with the upwardly inclined and inwardly directed wall 39 of the continuous groove 36 to thereby oppose the forces mentioned hereinabove.

Assuming that the fastener must for some reason or other be removed from the threaded opening for replacement of the member 30, or for any other reason, rotating the fastener 10 with any conventional device, will cause the fastener to be removed from the threaded opening as any conventional screw threaded fastener. This results from some phenomena which is not completely understood. However, it would appear that the upwardly directed forces produced by the deflected portions of each rib will tend to overcome the downwardly directed forces produced by the remaining portion of the rib to cause each individual rib to move along the helical rib defined by the thread.

Of course, it can readily be appreciated that the invention produces a simple and efficient manner of securing one member to another in which the fastener may be inserted into the threaded opening by merely producing an axial force thereon. However, the unique dimensioning and configuration of the ribbed fastener will allow such fastener to be removed as any conventional threaded fastener.

While the specific embodiment discloses ribs or louvers on the fastener as being spaced approximately equal to the pitch of the thread, it will be readily apparent that this spacing may be increased substantially and still have the fastener perform in its intended manner.

What is claimed is:

1. In combination, a locking device including a shank having a plurality of louvers spaced axially along said shank and an object having an internally threaded opening including a continuous helical rib defining a continuous helical groove, the improvement of said louvers each having an upwardly outwardly inclined wall terminating at a continuous outer edge which is perpendicular to the shank axis and which defines a diameter greater than the minor diameter of said helical rib but less than the major diameter of said helical groove, the edges of adjacent pairs of louvers being spaced a distance substantially equal to the pitch of said thread whereby a portion of each of said louvers will be received in engagement with a wall of said helical groove while a remaining portion of each of said louvers will be deflected inwardly and whereby said locking device may be inserted in said opening by axial movement of the device relative to the support and may be removed therefrom by relative rotational movement between the support and the device.

2. In combination, a fastening device and a support having an internally threaded opening which defines a thread having a constant pitch and in which the fastening device includes a shank portion having a plurality of upwardly inclined ribs extending outwardly therefrom, the improvement of said ribs having free edges disposed perpendicular to the axis of said shank and spaced axially on said shank a distance substantially equal to the pitch of the thread in said support whereby said fastening device may be inserted in said opening by said axial force applied to one end of said device and may be removed therefrom by rotational movement of said fastener.

3. In combination a fastening device and an object having an internally threaded opening defining a continuous helical rib, said fastening device comprising a headed shank a plurality of spaced louvers extending outwardly therefrom and integral therewith, the improvement of each of said louvers having an inclined outer wall directed towards said head and terminating at the upper end thereof in a continuous edge which extends perpendicular to the axis of said shank and has a diameter greater than the diameter of said shank but less than the major diameter of said thread and the axial distance between spaced edges of adjacent louvers is equal to or greater than the pitch of the thread in said opening so that not more than one of said louvers will be received between adjacent walls of the helical rib defining the thread.

References Cited

UNITED STATES PATENTS

| | | | | |
|---|---|---|---|---|
| 2,509,192 | 5/1950 | Poupitch | | 85—5 |
| 3,115,804 | 12/1963 | Johnson | | 85—4 |
| 3,251,260 | 5/1966 | Serdechny | | 85—7 |
| 3,272,059 | 9/1966 | Lyday et al. | | 85—5 |

FOREIGN PATENTS

| | | |
|---|---|---|
| 651,985 | 11/1962 | Canada. |
| 520,169 | 1940 | Great Britain. |
| 628,316 | 8/1949 | Great Britain. |
| 204,377 | 5/1966 | Sweden. |

MARION PARSONS, JR., Primary Examiner

U.S. Cl. X.R.

85—80